US008714797B2

(12) United States Patent
Hwu et al.

(10) Patent No.: US 8,714,797 B2
(45) Date of Patent: May 6, 2014

(54) INTEGRALLY FORMED MULTI-LAYER LIGHT-EMITTING DEVICE

(75) Inventors: Jon-Fwu Hwu, Hsinchu (TW); Yung-Fu Wu, Hsinchu (TW); Kui-Chiang Liu, Hsinchu (TW)

(73) Assignee: Gem Weltronics TWN Corporation, Hsinchu County (TW)

( * ) Notice: Subject to any disclaimer, the term of this patent is extended or adjusted under 35 U.S.C. 154(b) by 294 days.

(21) Appl. No.: 13/416,180

(22) Filed: Mar. 9, 2012

(65) Prior Publication Data

US 2013/0235574 A1 Sep. 12, 2013

(51) Int. Cl.
*B60Q 1/00* (2006.01)

(52) U.S. Cl.
USPC ....... 362/547; 362/545; 362/294; 362/249.02

(58) Field of Classification Search
USPC .......... 362/547, 545, 294, 249.02, 97.1, 97.3, 362/84, 623, 52, 235
See application file for complete search history.

(56) References Cited

U.S. PATENT DOCUMENTS 7,165,866 B2 * 1/2007 Li ................................ 362/294

FOREIGN PATENT DOCUMENTS

TW M387375 8/2010

* cited by examiner

*Primary Examiner* — Vip Patel
(74) *Attorney, Agent, or Firm* — Lin & Associates IP, Inc.

(57) ABSTRACT

An integrally formed multi-layer light-emitting device is provided, which includes a seat, a plurality of light-emitting elements, and two lead frames. The seat is integrally formed in such a manner that the light-emitting elements can fit in the chamber which is formed on the top portion of the central main body. The seat is made of metal, and thereby the seat can effectively absorb heat from the light-emitting elements, and rapidly transmit it to the surrounding environment. Therefore, the packing module is not needed to be used in the present invention so that the consumption of the package material is reduced, and the manufacturing process is simplified.

16 Claims, 3 Drawing Sheets

INTEGRALLY FORMED MULTI-LAYER LIGHT-EMITTING DEVICE

BACKGROUND OF THE INVENTION

1. Field of the Invention

The present invention relates to a light-emitting device, and more particularly to an integrally formed multi-layer light-emitting device.

2. The Prior Arts

The light-emitting theory of LED takes advantages of the intrinsic properties of semiconductors, which is different from the theory of electric discharging, heat and light-emitting of an incandescent light tube. Because light is emitted when electric current forward flowed across the PN junction of a semiconductor, the LED is also called cold light. The LED has the features of high durability, long service life, light weight, low power consumption, and being free of toxic substances like mercury, and thereby it can be widely used in the industry of the light-emitting device, and the LEDs are often arranged in an array and often used in such as electric bulletin board or traffic sign.

Taiwanese Utility Model Patent No. M387375 disclosed a package structure of an array type multi-layer LED, which included a metal substrate, a package module, a lead frame, and a mask, wherein the metal substrate was disposed on the bottom of the package structure, and the package module was used for encapsulating and fixing the lead frame over the metal substrate. The LED dies were arranged in an array on the metal substrate. The lead frames were electrically connected with the LED dies. The mask covered the package module.

However, the conventional LED package structure includes a package module which is usually made of plastic resin. The heat-dissipation efficiency of the plastic resin is much less than that of metal. If the heat-dissipation efficiency is low, the lifetime and the light-emitting efficiency of the LED package structure will be decreased. Another problem existing in the prior art is that the metal substrate is not integrally formed with the package module, and thereby the manufacturing process is complicated. Accordingly, it is desirable to provide a light-emitting device capable of solving the problems existing in the conventional LED package structure, such as low heat-dissipation efficiency, high consumption of package material, etc.

SUMMARY OF THE INVENTION

An objective of the present invention is to provide an integrally formed multi-layer light-emitting device. The integrally formed multi-layer light-emitting device includes a seat including a central main body and a plurality of heat dissipation fins, wherein the top portion of the central main body has a chamber, the bottom surface of the chamber is a light-emitting surface, and the inner surface of the sidewall of the chamber is a light-reflective surface, and wherein the central main body has two through holes formed therein; a plurality of light-emitting elements disposed on the light-emitting surface, wherein the light-emitting elements are electrically connected with each other by wire-bonding; and two lead frames respectively passed through the two through holes, wherein the two lead frames are electrically connected with the light-emitting elements by wire-bonding, and at least one sealing body is provided in each through hole and used for sealing each through hole, and the two lead frames are respectively fixed in the two through holes by the at least one sealing body.

The seat is integrally formed in such a manner that the light-emitting elements can fit in the chamber which is formed on the top portion of the central main body. In other words, the light-emitting elements can be directly disposed in the chamber. The seat is made of metal, and thereby the seat can effectively absorb heat generated from the light emitting elements in operation, and rapidly transmit it to the surrounding environment. Therefore, the packing module is not needed to be used in the present invention so that the consumption of the package material is reduced, and the manufacturing process is simplified.

According to one embodiment of the present invention, the integrally formed multi-layer light-emitting device can further includes a mask which is tightly engaged with the central main body so that the mask covers and seals the top of the chamber. Therefore, the moisture and fine particles in air cannot enter the chamber, and thereby the optical elements of the light-emitting device can be protected from deterioration of their properties.

Moreover, an included angle between the light-emitting surface and the light-reflective surface can be set between 20° to 70°. The light-emitting angle range for the light-emitting element can be adjusted by adjusting the included angle between the light-emitting surface and the light-reflective surface.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
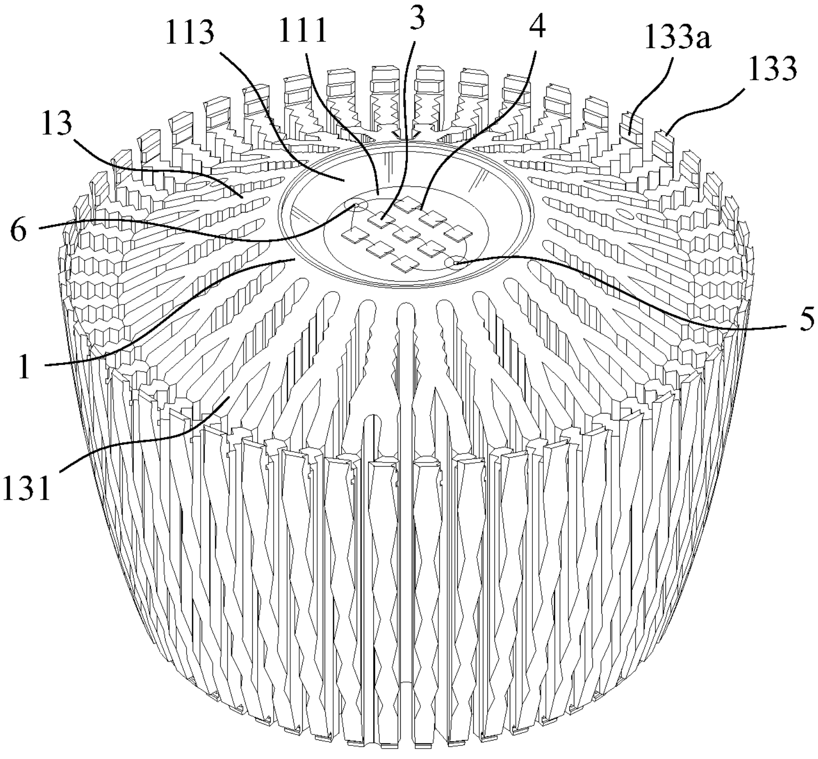
FIG. 1 is a schematic perspective view showing the integrally formed multi-layer light-emitting device according to the present invention.
Figure 2:
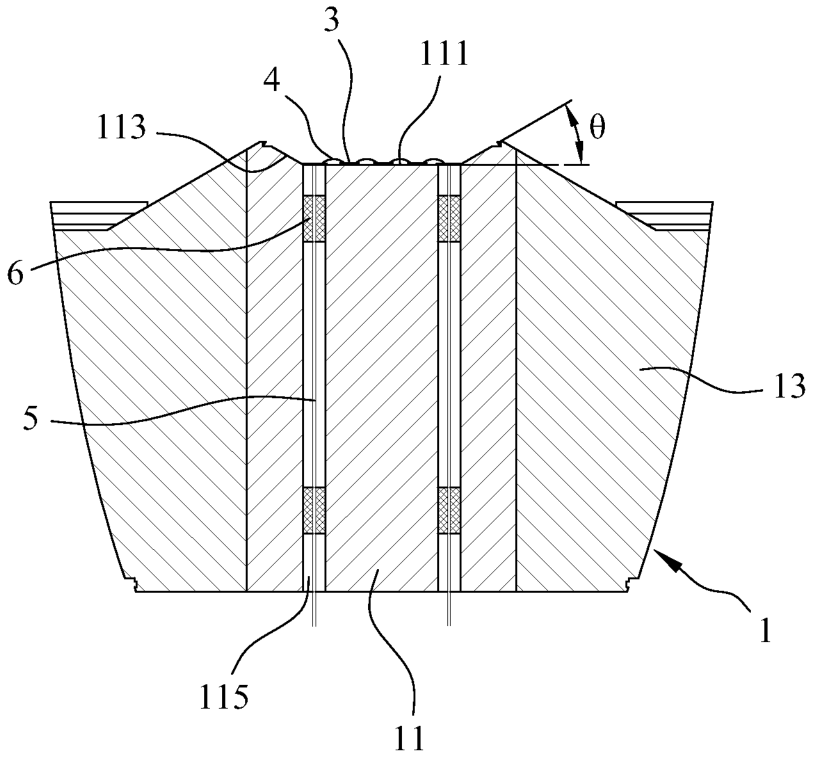
FIG. 2 is a cross-sectional view showing the integrally formed multi-layer light-emitting device according to the present invention.

FIG. 1 is a schematic perspective view showing the integrally formed multi-layer light-emitting device according to the present invention. FIG. 2 is a cross-sectional view showing the integrally formed multi-layer light-emitting device according to the present invention.

The integrally formed multi-layer light-emitting device includes a seat 1, a plurality of light-emitting elements 3, and two lead frames 5. The seat 1 includes a central main body 11 and a plurality of heat dissipation fins 13. The central main body 11 and the heat dissipation fins 13 are made of aluminum. A chamber is formed in the top portion of the central main body 11. The bottom surface of the chamber is served as a light-emitting surface 111. The inner surface of the sidewall of the chamber is served as a light-reflective surface 113. The central main body 11 has two through holes 115 formed therein. The chamber is formed by a punching process, a milling process, or other suitable processes.

The heat dissipation fins 13 are extended radially outward from the cylindrical wall of the central main body 11. These heat dissipation fins 13 are spaced around the circumference of the central main body 11, and each of the heat dissipation fins 13 has a branched structure 131 at its outer end extended outwardly, and thereby the heat dissipation area of the heat dissipation fin 13 can be increased. The heat dissipation fins 13 are designed to have a corrugated shape such as wave-like or tooth-like shape. The heat dissipation areas of the corrugated heat dissipation fins 13 are much larger than those of the flat heat dissipation fins, and thereby the heat dissipation efficiency of the heat dissipation seat 10 is greatly increased. Moreover, the central main body 11 and the heat dissipation fins 13 are made of a solid aluminum.

A fixing piece 133 can be engaged with the outer end edge portion of each heat dissipation fin 13. The fixing piece 133 is designed to have a corrugated shape. The first and second fixing portions 133*a* are respectively protruded inwardly from the upper and lower portions of the fixing piece 133. The first and second fixing portions 133*a* are used for fastening the seat 1 to the other elements (such as a diffusion cover).

The light-emitting elements 3 are arranged in an array on the light-emitting surface 111, and electrically connected with each other by wire-bonding with the use of the metal wires 4. The light-emitting elements 3 are, for example, the LED dies.

In one embodiment of the present invention, a chromium layer (not shown in the Figures) is electroplated onto the light-emitting surface 111 and the light-reflective surface 113 in order to increase the reflectivity of light emitted from the light-emitting elements 3. A silver layer (not shown in the Figures) can be further electroplated onto the chromium layer on the light-emitting surface 111 in order to enhance the attachment of the LED dies to the light-emitting surface 111.

In one embodiment of the present invention, a reflector (not shown in the Figures) is disposed on the light-reflective surface 113. The light emitted from the light-emitting elements can be reflected by the reflector to the surrounding environment. An included angle θ between the light-emitting surface 111 and the light-reflective surface 113 can be set between 20° to 70°. The light-emitting angle range for the light-emitting element 3 can be adjusted by adjusting the included angle θ between the light-emitting surface 111 and the light-reflective surface 113.

Referring to FIG. 2, two lead frames 5 are respectively passed through the two through holes 115. The two lead frames 5 are electrically connected with the light-emitting elements 3 by wire-bonding with the use of the metal wires 4. The ends of the lead frames 5 are preferably electroplated with silver which can enhance the wire bonding strength for bonding with the light-emitting elements 3.

Referring to FIG. 2, the sealing bodies 6 used for sealing the through holes 115 are provided in the upper and lower portions of the two through holes 115. By using the sealing bodies 6, the two lead frames 5 can be respectively fixed in the two through holes 115 and electrically insulated from the outside of the central main body 11. Moreover, the moisture and fine particles in air can be prevented from entering the chamber by the sealing bodies 6. The light-emitting elements 3 are wire-bonded to the lead frames 5 using the gold wires.

The sealing bodies 6 can be made of glass, ceramics, or epoxy resin. While the glass, ceramics, or epoxy resin is in a semi-liquid state at high temperature, it is filled in the two through holes 115. Then, the glass, ceramics, or epoxy resin in the semi-liquid state is cured to form the sealing bodies 6.

Figure 3:
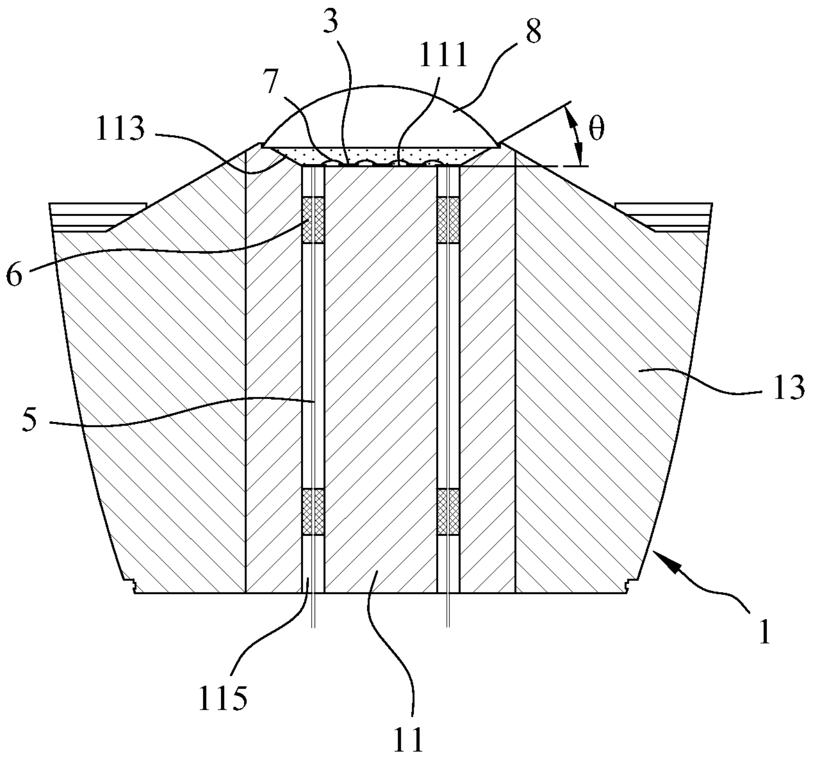
FIG. 3 is a cross-sectional view showing the integrally formed multi-layer light-emitting device according to one embodiment of the present invention.

FIG. 3 is a cross-sectional view showing the integrally formed multi-layer light-emitting device according to one embodiment of the present invention. Referring to FIG. 3, the integrally formed multi-layer light-emitting device can further include a phosphor layer 7 which covers the light-emitting elements 3. The light emitted from the light-emitting elements 3 will pass through the phosphor layer 7 in which different lights will be mixed together. The integrally formed multi-layer light-emitting device can further includes a mask 8 which is tightly engaged with the central main body 11 so that the mask 8 covers and seals the top of the chamber. The mask can have the shape of semi-sphere. The mask can be made of, for example, glass or silicone.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An integrally formed multi-layer light-emitting device, comprising:

a seat, including a central main body and a plurality of heat dissipation fins, a top portion of the central main body having a chamber, a bottom surface of the chamber being a light-emitting surface, an inner surface of a sidewall of the chamber being a light-reflective surface, the central main body having two through holes formed therein;

a plurality of light-emitting elements, disposed on the light-emitting surface, the light-emitting elements being electrically connected with each other by wire-bonding; and two lead frames, respectively passed through the two through holes, the two lead frames being electrically connected with the light-emitting elements by wire-bonding, at least one sealing body being provided in each through hole and used for sealing each through hole, the two lead frames being respectively fixed in the two through holes by the at least one sealing body.

2. The light-emitting device according to claim 1, wherein the central main body and the heat dissipation fins are made of aluminum.

3. The light-emitting device according to claim 1, wherein the chamber is formed by at least one of a punching process and a milling process.

4. The light-emitting device according to claim 1, wherein the light-emitting elements are arranged in an array on the light-emitting surface.

5. The light-emitting device according to claim 1, wherein the light-emitting elements are a plurality of the LED dies.

6. The light-emitting device according to claim 1, wherein the light-emitting surface and the light-reflective surface each has a chromium layer formed thereon.

7. The light-emitting device according to claim 6, wherein the light-emitting surface has the chromium layer further having a silver layer formed thereon.

8. The light-emitting device according to claim 1, wherein the light-emitting elements are wire-bonded to the two lead frames using a plurality of gold wires.

9. The light-emitting device according to claim 1, wherein the at least one sealing body is made of glass, ceramics, or epoxy resin.

10. The light-emitting device according to claim 1, wherein ends of the two lead frames are electroplated with silver.

11. The light-emitting device according to claim 1, further comprising a reflector disposed on the light-reflective surface.

12. The light-emitting device according to claim 1, wherein an included angle between the light-emitting surface and the light-reflective surface is set between 20° to 70°.

13. The light-emitting device according to claim 1, further comprising a phosphor layer covering the light-emitting elements.

14. The light-emitting device according to claim 1, further comprising a mask which is tightly engaged with the central main body so that the mask covers and seals a top of the chamber.

15. The light-emitting device according to claim 14, wherein the mask has a shape of semi-sphere.

16. The light-emitting device according to claim 14, wherein the mask is made of glass or silicone.

* * * * *